United States Patent [19]

Lundén

[11] Patent Number: 4,995,169

[45] Date of Patent: Feb. 26, 1991

[54] DEVICE FOR INDICATING ANGULAR POSITION

[75] Inventor: Göran Lundén, Falsterbo, Sweden

[73] Assignee: Moagon AG, Zurich, Switzerland

[21] Appl. No.: 527,651

[22] Filed: May 22, 1990

Related U.S. Application Data

[63] Continuation of Ser. No. 372,337, filed as PCT SE87/00604 on Dec. 14, 1987, published as WO88/04765 on Jun. 30, 1988, abandoned.

[30] Foreign Application Priority Data

Dec. 18, 1986 [SE]  Sweden ............................. 8605437

[51] Int. Cl.$^5$ .................... G01B 3/56; G01B 11/14; G01C 9/12
[52] U.S. Cl. ..................................... 33/534; 33/1 N; 33/391; 33/399; 250/237 G; 356/374
[58] Field of Search ............. 33/1 N, 1 PT, 391, 399, 33/534; 356/374; 250/237 G

[56] References Cited

U.S. PATENT DOCUMENTS

| | | | |
|---|---|---|---|
| 3,166,624 | 1/1965 | Vargady | 250/237 G |
| 3,945,129 | 3/1976 | Bergkvist | 33/1 N |
| 4,288,056 | 9/1981 | Bergström | 33/395 |
| 4,336,659 | 6/1982 | Bergkvist | 33/395 |
| 4,343,090 | 8/1982 | Bergkvist | 33/283 |

FOREIGN PATENT DOCUMENTS 7611511  10/1976  Sweden .

Primary Examiner—William A. Cuchlinski, Jr.
Assistant Examiner—Alvin Wirthlin

[57] ABSTRACT

Device for indicating the angular position between a first part and a part which is rotatable relative to the first part. Each of these parts exhibits a grating (15, 16) consisting of a pattern which, in each grating, comprises opaque lines separated by interspaces, the gratings together being arranged to provide an easily readable moiré pattern which indicates whether the opaque lines in the one grating are at a certain position relative to the opaque lines of the other grating. The interspaces of each grating (15, 16) exhibit mutually differing widths, with a width which gradually increases over the height of the one grating (15) in a direction transverse to the longitudinal direction of the interspaces and a width which gradually decreases over the height of the other grating (16) transverse to the longitudinal direction of the interspaces and in the same direction.

3 Claims, 4 Drawing Sheets

DEVICE FOR INDICATING ANGULAR POSITION

This application is a continuation of application serial number 07/372,337, filed June 19, 1989 and now abandoned.

TECHNICAL FIELD:

The present invention relates to a device for indicating an angular position between a first part and a part which is rotatable in relation to the first part, each of the parts exhibiting a grating consisting of a pattern which, in each grating, comprises opaque lines, separated by interspaces, the gratings together being arranged to create an easily readable moiré pattern which shows the particular position of the opaque lines in the one grating relative to the opaque lines in the other grating.

BACKGROUND:

The Swedish patent specifications SE 7,307,577-2 and 7,611,511-2 are examples of a practical application of angle gauges which are founded on the technique used in the present invention, namely, the moiré effect. In these known devices a moiré pattern arises by two gratings being provided on parts which are rotatable relative to one another, whereby a pattern arises which indicates whether the two parts are located at a desired angular position relative to one another or whether they deviate from this angular position. The angle gauges can be provided with a graduated angular scale, by means of which the gauge can be used to obtain a directly readable value, for example, for an object, such as a parabolic antenna, which can be adjusted for different angular positions. The angular position relative to the horizontal plane is arrived at by the one part being made unbalanced so that it continually strives to assume a position which is unchanging relative to the horizontal plane. In these cases it may prove difficult, using the previously known devices, to achieve both a high degree of adjustment accuracy and simplicity of adjustment due to the fact that a high degree of adjustment accuracy is associated with undesirably quick and large motions of the moiré pattern for each angular change.

The object of the present invention is to provide a device by means of which a high degree of adjustment accuracy, as well as simplicity of adjustment, can be achieved.

THE SOLUTION:

The stated object is achieved by means of device which is characterized by the interspaces of each grating exhibiting mutually differing widths, whereby one width gradually increases over the height of the one grating in a direction transverse to the longitudinal direction of the interspaces, and, over the height of the second grating, a width which gradually decreases transverse to the longitudinal direction of the interspaces, in the same direction.

BRIEF DESCRIPTION OF THE DRAWINGS

The invention will be described in more detail below using an exemplifying embodiment with reference to the accompanying drawings, in which.

BEST MODE OF CARRYING OUT THE INVENTION

Figure 1:
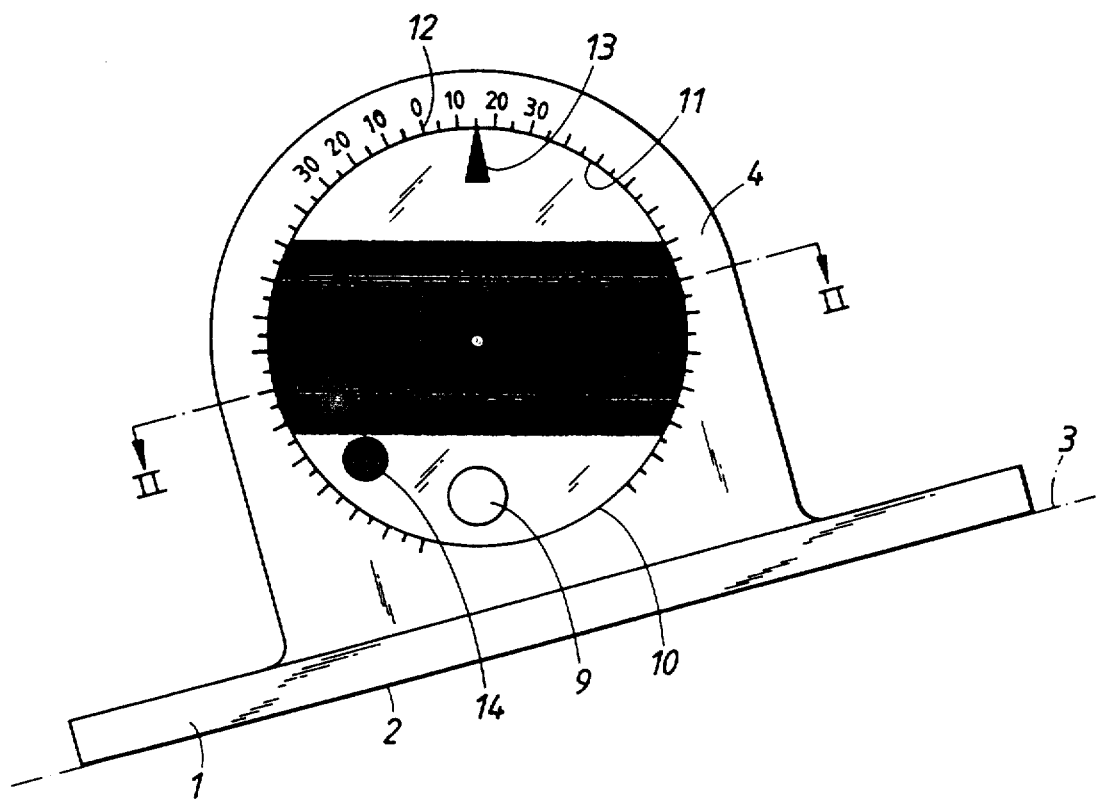
FIG. 1 is a side view of a device for indicating angular position in accordance with the present invention.
Figure 2:
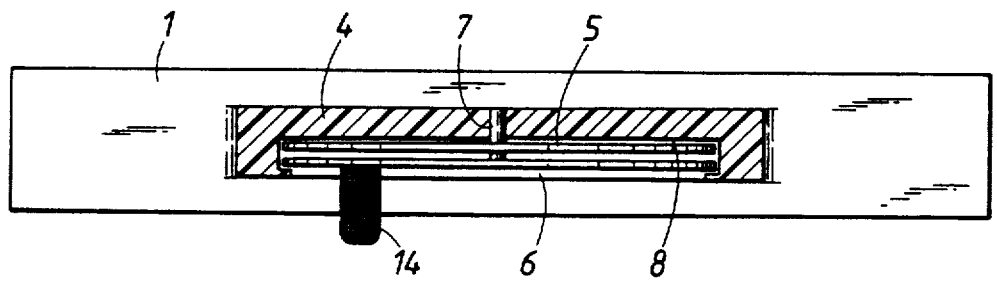
FIG. 2 shows a cross section of the device according to FIG. 1 along the line II—II.

The angle gauge shown in FIGS. 1 and 2 is an example of the application of the device according to the invention. It consists of a ruler 1 having a measurement surface 2, which is intended to be placed against the surface 3, the angular position of which relative to the horizontal plane is to be measured. A gauge housing 4 is securely attached to the ruler 1 and rotatably journalled in it in bearings, are two parts 5, 6 which are movable relative to one another. These are journalled in bearings, relative to the gauge housing 4 about a common axle 7. The gauge housing 4 in the illustrated example exhibits a mainly cylindrical opening 8 in which the two parts 5 and 6 fit. These consist of two circular and, preferably, congruently shaped discs, which are parallel to one another and are located as close to one another as possible. The one disc 5 can move relatively freely and is arranged with its center of gravity displaced from the axis of rotation 7, for example, by means of a weight 9 located eccentrically near the perifery 10 of the disc 5, whereby the disc continually strives to assume a certain angular position relative to the horizontal plane. The second disc 6 is suitably balanced so that its center of gravity coincides with the axis of rotation and it is mounted with such friction relative to the gauge housing 4, that it maintains a set angular position relative to the gauge housing.

The gauge housing 4 exhibits a circular periferal edge 11 of the opening 8, which is provided with a measurement scale 12 which, to a suitable extent, is graduated in degrees of angle, starting from a 0-position. The graduation is preferably provided in both directions, whereby, schematically, only a few degree markings are shown, which may for example extend 150° in either direction. The outer disc 6 is additionally provided with an indication point 13 in the form of an arrow, by means of which the angular position is read from the measurement scale. The outer disc also has a maneuver device 14 in the form of a grip knob, by means of which the outer disc 6 is rotated to a current position, as will be described in greater detail below.

Figure 3:
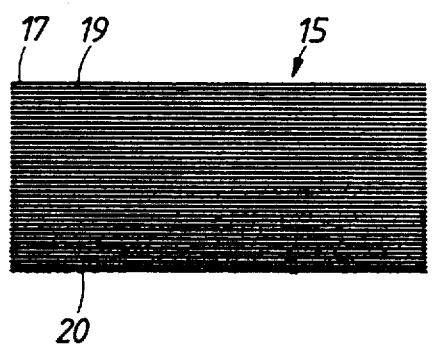
FIG. 3 and FIG. 4 show examples of gratings incorporated in the device according to the invention.
Figure 4:
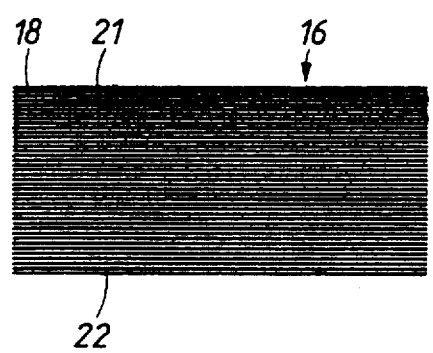

The discs 5, 6 consist preferably of transparent plastic discs, each of which is provided with a grating 15, 16, the gratings being shown in FIGS. 3 and 4. In the example shown the two gratings are identical but are mirror-inverted about a central horizontal axis of symmetry. The gratings consist of a large number of opaque lines 17, 18, for example black lines, which are separated by transparent linear interspaces 19, 20, 21, 22. In the example shown the lines of the two gratings have, over their entire height, the same width, which, in the current application, may for example be 0.5 mm, whereas the interspaces exhibit a width which changes gradually over the height of the gratings. The gratings are so arranged that the one grating, which, for example, is arranged on the inner or rear part, i.e. the disc 5, exhibits transparent interspaces, which are wider at the top than the interspaces which are located at the bottom, whereas the grating 16, which, for example, is placed on the front part, i.e. the disc 6, exhibits interspaces with the smallest width at the top and the greatest width at the bottom. In the example shown, the uppermost interspace 19 in the grating 15 has the greatest width, which corresponds to the width of the lowermost interspace 22 in the grating 16, whereas the lowermost interspace 20 in the grating 15 has the same width as the uppermost interspace in the grating 16, whereby, furthermore, the intermediate interspaces gradually change in width over the height of the gratings in a manner which is identical for both of the gratings. According to one advantageous example, the narrowest interspace may for example exhibit a width of 0.190 mm and each interspace may increase in width by 0.005 mm to a largest width of 0.310 mm. The change in width and size of the outer interspaces depends on the width of the gratings and on the application of interest.

Figure 5:
FIG. 5 shows the two gratings positioned directly in front of each other indicating the relative angular position 0 between the two gratings.
Figure 9:
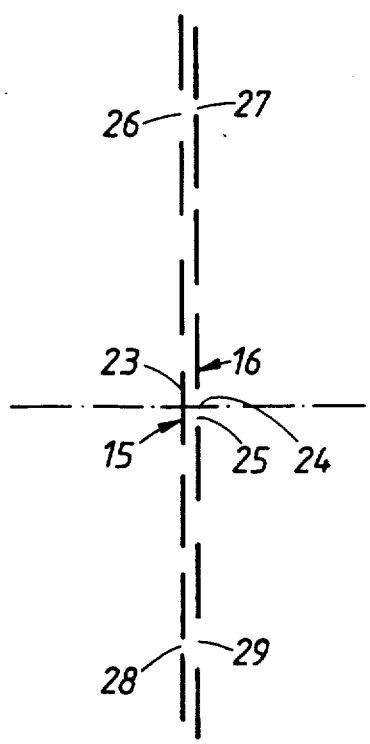
FIG. 9 illustrates the principle of construction for the two gratings.

The principle of construction of the two gratings 15, 16 is shown by the schematic view of FIG. 9. In this case the change in width of the interspaces is greatly exaggerated so that the change may be seen clearly with the naked eye. FIG. 9 can be considered to be a schematic cross-section through a central portion of the two gratings. By this it is seen that, in the example shown, the rear grating 15 is centered with an opaque line 23 directly in front of a central axis of symmetry 24, which is perpendicular to the gratings and which coincides with the axis of rotation 7. The front grating 16 instead has an interspace 25 which is located centrally in the grating and is located directly in front of the opaque line 23 and is thus centered relative to the axis of symmetry 24. Since the width of the interspaces of the rear grating increases in an upwards direction at the same time as the width of the interspaces in the front grating decreases in an upward direction, there is a mutual overlapping of the lines of the two gratings over a central portion of the gratings out to a certain distance from the axis of symmetry 24, at which two interspaces 26, 27, 28, 29 are so located that light can pass through both of the gratings. This distance from the axis of symmetry 24 is constant over the entire width of the grating only in the case in which the two gratings are placed with their opaque lines and interspaces being completely parallel, as is shown in FIG. 5. It is thus seen that a highly visible central black band 30 appears centrally in the grating image, surrounded by two narrower light bands 31, 32, one on each side of the black band, in which light bands the interspaces are thus placed so that they together form a band of transparent straight gaps. Above the light band a displacement has taken place so that the black lines once again cover each other and form narrower black bands 33, 34.

Figure 6:
FIG. 6 shows a very small deviation in the angular position between the two gratings.

A very small rotation of the gratings 15, 16 relative to one another results in a moiré pattern as in FIG. 6, in which a light wedge 35 appears.

Figure 7:
FIG. 7 shows a clear deviation in angular position between the two gratings.

Upon further rotation of the two gratings 15, 16 relative to one another, a grating image as in FIG. 7 arises, which exhibits arrow-shaped black bands 36 separated by arrow-shaped light bands 37.

Figure 8:
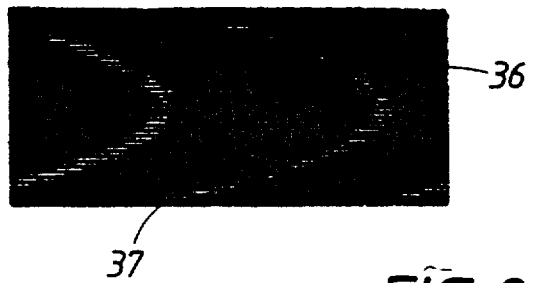
FIG. 8 likewise shows a clear deviation in angular position between the two gratings, but with the gratings being rotated relative to one another in a direction opposite that shown in FIG. 7.

At a mutual rotational position for the two gratings 15, 16, after rotation in the opposite direction, a grating pattern according to FIG. 8 is obtained, which, in like manner, exhibits arrow-shaped black bands 36 and intermediate arrow-shaped light bands 37, but they point in the opposite direction.

Through the previously known optical interference phenomenon of the moiré effect, light and dark bands thus arise which lead to a sensitive, but relatively easily read pattern image, which changes according to the relative positions of the gratings.

With reference to FIGS. 1, 2 as well as to FIGS. 5–8, the use of the device according to the invention will be described in connection with the angle gauge shown in FIGS. 1 and 2. When one wishes to know the inclination of a surface, measured in degrees, the angle gauge is placed with its ruler 1 on the surface in the direction of inclination of the surface, i.e., so that the gauge housing 4, and thus the grating discs 5, 6, are continuously positioned generally in a vertical plane. In this context it should be pointed out that the supporting surface 2 of the angle gauge consists of a planar surface which is perpendicular to the plane of the grating discs 5, 6. The rear grating disc 5 thereupon adjusts itself so that the lines and interspaces of its corresponding grating are horizontal. Depending upon the momentary position of adjustment of the front grating disc 6, a grating image will be obtained which is probably similar to one of the grating images shown in to FIGS. 5–8. If the outer disc, referred to hereafter as the rotatable disc 6 has its marking 13 directly adjacent to the 0 position, the pattern shown in FIG. 7 will arise, in which the direction of the arrows indicates the direction of downwards inclination. Proceeding from this position, the rotatable disc is turned by grasping the adjustment knob 14 with one's hand and turning the rotatable disc clockwise so that its corresponding grating 15 assumes a horizontal position. When one is close to the horizontal position the image shown in FIG. 6 will generally arise, whereupon one slowly moves the rotatable disc back and forth so that the wedge-shaped light field 35 disappears and the grating image according to FIG. 5 is achieved. If a wedge-shaped light field arises along the left edge of the grating image instead, one has passed the correct adjustment position, whereupon one moves the disc back so that the image according to FIG. 5 is achieved, in which both of the light bands 31, 32 will be horizontal and parallel and the broad black band will thus have parallel long edges. The angular position is then read from the angle scale directly adjacent to the marker arrow 13.

The angle gauge is used in a manner similar to that for a bubble level by setting the marker arrow 13 exactly adjacent to the 0-position on the angle scale or immediately in front of the 90° position, whereupon the moiré image is inspected. In the correct angular position the moiré image according to FIG. 5 will be achieved and, for a small deviation, an image principally as shown in FIG. 6 will arise, with the wedgeshaped light field pointing from one direction or the other and, for a larger angular deviation, in one direction or the other, grating images principally as shown in FIGS. 7 and 8 will arise, whereby the direction of the arrows indicates the direction of inclination.

The shape of the arrows indicates the degree of deviation since a large angular deviation will lead to a more obtuse arrow shape.

The invention is not limited to the exemplifying embodiment described above and shown in the drawings but may be varied within the scope of the following patent claims. For example, higher grating images can be used so that a pair of smaller black bands arises on either side of the broad black band, so that coarse adjustment is additionally faciliated. Coarse adjustment is thus made by first observing the side bands, whereas fine adjustment is made using the central band. The width of the interspaces can also be changed according to a different pattern than the one shown above, for example, progressively increasing width. Furthermore, the two gratings can be displaced in such a way that a light band is achieved centrally at the axis of symmetry 24. This is achieved by positioning two interspaces directly in front of each other at the axis of symmetry, whereby a broad light band is achieved which is surrounded by at least two narrower black bands. An instrument for indicating deviations from the purely horizontal or vertical position, corresponding to a bubble level, does not in principle require two movable gratings; rather, the one grating 6 can be mounted immovably in the gauge housing. Furthermore, the device can be utilized in other instruments or aids for which angular positions are to be set.

I claim:

1. A device for indicating angular position between a first part (5) and a part (6) which is rotatable relative to the first part, each of the parts exhibiting a grating (15, 16) consisting of a pattern which, for each grating, comprises opaque lines (17, 18), separated by interspaces (19, 20, 21, 22), the gratings together being arranged to provide an easily readable moreépattern which indicates whether the opaque lines in the one grating have a certain position relative to the opaque lines in the other grating, comprising:

the interspaces (19-22) of each grating (15, 16) exhibit mutually deviating width with a width increasing gradually over the height of the one grating (15) in a direction transverse to the longitudinal direction of the interspaces, and with a width gradually decreasing over the height of the second grating (16) transverse to the longitudinal direction of the interspaces in the same direction;

the opaque lines (17, 18) in each grating exhibit equal width and the opaque lines of the one grating (15) exhibit the same width as the opaque lines of the other grating; and said two gratings (15, 16) being mutually identical but mirror-inverted so that the edge of the grating, at which the interspace having the least width is located, is located adjacent to the edge of the other grating (16), at which the interspace having the greatest width is located; and said two gratings (15, 16) are so positioned in relation to one another that, at a central axis of symmetry (24), the one grating (15) exhibits a central opaque line (23) and the other grating (16) exhibits an interspace (25) directly in front of the central opaque line of the one grating.

2. A device according to claim 1 wherein said first part (5) comprises a rotatably journalled disc in a gauge housing (4), the rotatably journalled disc being arranged as a pendulum whereby it continuously strives to assume a predetermined angular position relative to the horizontal plane, in addition to which the gauge housing is securely attached to a gauge ruler (1) having a measurement surface (2) intended for placement against a plane (3), the inclination of which is to be ascertained.

3. A device according to claim 2, wherein the other part (6) comprises a second disc rotatably journalled in the gauge housing (4), the second rotatably journalled disc being adjustable to different angular positions relative to the gauge housing by means of a measurement scale (12).

* * * * *